United States Patent
Mi et al.

(10) Patent No.: US 6,523,067 B2
(45) Date of Patent: Feb. 18, 2003

(54) SYSTEM AND METHOD FOR USING INTERNET BASED CALLER ID FOR CONTROLLING ACCESS TO AN OBJECT STORED IN A COMPUTER

(75) Inventors: James Mi, Sunnyvale, CA (US); Vishesh Parikh, Mountain View, CA (US); Albert Teng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/121,174

(22) Filed: Apr. 12, 2002

(65) Prior Publication Data

US 2002/0116616 A1 Aug. 22, 2002

Related U.S. Application Data

(62) Division of application No. 09/234,051, filed on Jan. 19, 1999, now Pat. No. 6,418,472.

(51) Int. Cl.⁷ .............................................. G06F 13/14
(52) U.S. Cl. ........................ 709/229; 713/201; 713/170
(58) Field of Search ................................. 713/200, 201, 713/168, 170; 709/229

(56) References Cited

U.S. PATENT DOCUMENTS

| | | | | |
|---|---|---|---|---|
| 4,545,012 A | | 10/1985 | Clancy et al. .............. 711/200 |
| 4,866,769 A | | 9/1989 | Karp ........................... 705/56 |
| 5,224,166 A | * | 6/1993 | Hartman, Jr. ................ 713/190 |
| 5,542,087 A | | 7/1996 | Neimat et al. ................. 707/10 |
| 6,081,900 A | * | 6/2000 | Subramaniam et al. ..... 713/201 |
| 6,105,027 A | * | 8/2000 | Schneider et al. ............. 707/9 |
| 6,189,103 B1 | * | 2/2001 | Nevarez et al. ............. 713/201 |
| 6,317,838 B1 | * | 11/2001 | Baize ......................... 713/201 |
| 6,408,336 B1 | * | 6/2002 | Schneider et al. .......... 709/229 |
| 6,418,472 B1 | * | 7/2002 | Mi et al. ..................... 709/229 |

\* cited by examiner

*Primary Examiner*—Kenneth R. Coulter
(74) *Attorney, Agent, or Firm*—Blakely, Sokoloff, Taylor & Zafman LLP

(57) ABSTRACT

A system and method for controlling access to an object. The system stores an object and a processor identifier. The system includes a verification agent that can access information embedded in a processor and then calculate from that embedded information a value that may be compared with the stored processor identifier. A comparison agent is used to compare that value with the processor identifier to determine whether the processor corresponds to the processor identifier. If the value that the verification agent returns matches the processor identifier, then the computer grants the user access to the object.

2 Claims, 6 Drawing Sheets

US 6,523,067 B2

SYSTEM AND METHOD FOR USING INTERNET BASED CALLER ID FOR CONTROLLING ACCESS TO AN OBJECT STORED IN A COMPUTER

This is a divisional application of Ser. No. 09/34,051 filed Jan. 19, 1999, now U.S. Pat. No. 6,418,472.

FIELD OF THE INVENTION

The present invention relates generally to the field of access control, and particularly to a system and method for verifying the identity of a platform or other device prior to granting access to a private communication channel, to data or to programs.

BACKGROUND OF THE INVENTION

The Internet has become a convenient way for a broad class of computer users to access, distribute and exchange information—evident from the large number of individuals, companies and other organizations that have established web sites on the World Wide Web. The Internet permits users to easily access publicly available information, to communicate over private channels, and to access restricted information, such as medical records and bank accounts.

Although the user's identity is of little importance when granting access to a publicly available web site, strong user authentication is needed to limit access to private teleconferences and restricted information. As users begin to adopt the Internet as a communication channel, the need to identify those calling in from the other end of the line, i.e., the need for a "caller ID" feature like the one telephone companies provide, is becoming more important. Such a "caller ID" feature may apply to on-line banking, remote user dial in to access confidential information, and communications (e.g., to control access to chat rooms or private teleconferences, or to facilitate on-line game usage). In addition, such a "caller ID" feature may enable parental control to prevent children from accessing various web sites.

Although at first glance current authentication methods, such as user identification/password combinations, tokens, and digital signatures, may seem capable of providing such a "caller ID" function, there are drawbacks to using such methods. Although the combination of a user name (or other user identification) with a user password is easy to implement, such a combination is not very reliable. Passwords may be derived from guesswork or using relatively unsophisticated cracking tools. They also may be shared. Content providers are especially vulnerable to password sharing, which can result in unintentionally supplying content to non-subscribers who obtained access to a subscriber's password. Storing a user identification, password combination in a "cookie", which a web server can read prior to permitting browser access, does not solve this inherent problem, as cookies can be shared, too.

Tokens provide stronger authentication, but are expensive to deploy and maintain. A digital signature may not reliably identify a user, if the user either accidentally or intentionally gives imposters access to the user's private key. Moreover, broad deployment of this authentication method requires a public key infrastructure that does not yet exist.

Given the drawbacks inherent in currently available authentication methods, there is a need for an inexpensive, scaleable, tamper resistant, and user friendly way to verify a users identity. As the user generally relies on a computer or other device to obtain access to data and programming instructions, one way to help identify the user—e.g., to ensure access is restricted to authorized users only—is to identify the platform or other device the user employs when trying to obtain access. As described below, the present invention proposes a system and method for identifying such a platform or device prior to granting access to an object.

SUMMARY OF THE INVENTION

The present invention relates to a system and method for controlling access to an object. The system stores an object and a processor identifier. The system includes a verification agent that can access information embedded in a processor and then calculate from that embedded information a value that may be compared with the stored processor identifier. A comparison agent is used to compare that value with the processor identifier to determine whether the processor corresponds to the processor identifier. If the value that the verification agent returns matches the processor identifier, then the user is granted access to the object.

There are many applications for a processor identifier, or other platform identifier, as will be described in more detail below. Some examples include: Internet based communication; Internet based activities restricted to only certain users; web surfing pattern tracking, which may enable content providers and on-line retailers to tailor their products to meet customer preferences; on-line voting, surveys or similar user preference activity; and for verifying the identity of a user seeking access over a virtual private network.

DETAILED DESCRIPTION OF THE PRESENT INVENTION

Figure 1:
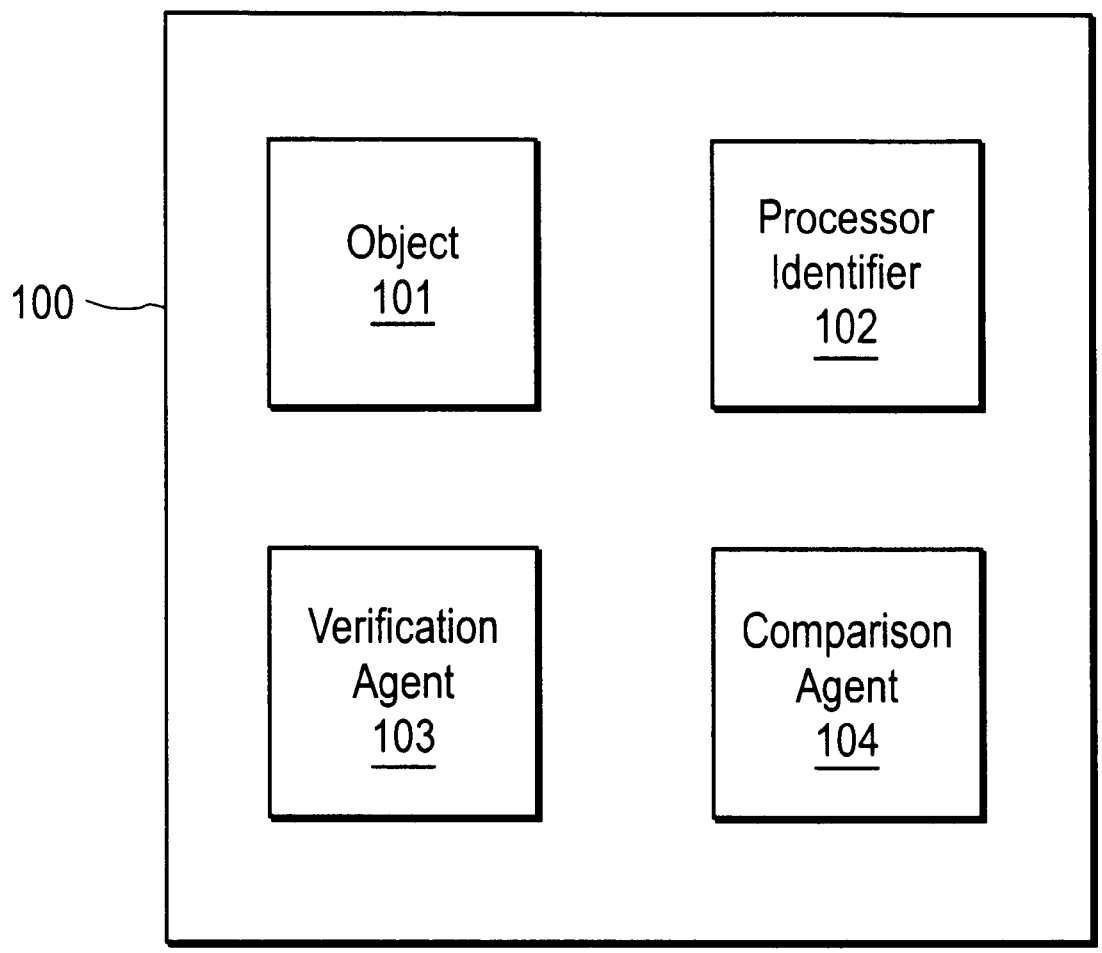
FIG. 1 is a block diagram illustrating one embodiment of the system of the present invention for controlling access to an object.

An improved system and method for controlling access to an object is described. FIG. 1 is a block diagram that illustrates one embodiment of such a system. System 100 stores object 101. Object 101 may consist of data and/or executable code. Such executable code may, for example, contain a program that permits a user to communicate with one or more other users over the Internet. Object 101 may be stored in a machine readable storage medium such as, for example, a floppy or hard disk drive.

System 100 may be a type of computer, including for example a network server, web server, desktop or notebook PC, or hand held computing device. Alternatively, system 100 may comprise consumer electronics apparatus that can control access to object 101. When a network or web server, a RAID storage unit may be associated with system 100, which may store object 101.

System 100 stores a processor identifier 102. Access to object 101 is limited to devices that contain a processor, which corresponds to processor identifier 102. Processor identifier 102 preferably is a "processor number" (as defined below) or a hash of a processor number with another value. When system 100 is a network or web server, processor identifier 102 may be stored in an associated RAID storage unit.

For determining whether a device's processor corresponds to processor identifier 102, system 100 includes a verification agent 103 and a comparison agent 104. Verification agent 103 can access information embedded in a processor, e.g., a processor number, and calculate from that embedded information a value that may be compared with processor identifier 102.

Comparison agent 104 compares to processor identifier 102 the value that verification agent 103 returns. If that value matches processor identifier 102, then the device is granted access to object 101.

Verification agent 103 and comparison agent 104 may reside on a network or web server. Alternatively, they may reside on the device that includes the processor with the embedded information or on a separate machine readable storage medium for use with the network or web server, the device containing the embedded information or some other device. Verification agent 103 thus comprises any software, hardware or combination of software and hardware that can access information embedded in a processor and calculate from that information a value that may be compared with the processor identifier—irrespective of where or how verification agent is physically stored or located. Likewise, comparison agent 104 comprises any software, hardware or combination of software and hardware that can compare with the processor identifier the value that verification agent 103 returns—irrespective of where or how comparison agent 104 is physically stored or located.

Figure 2:
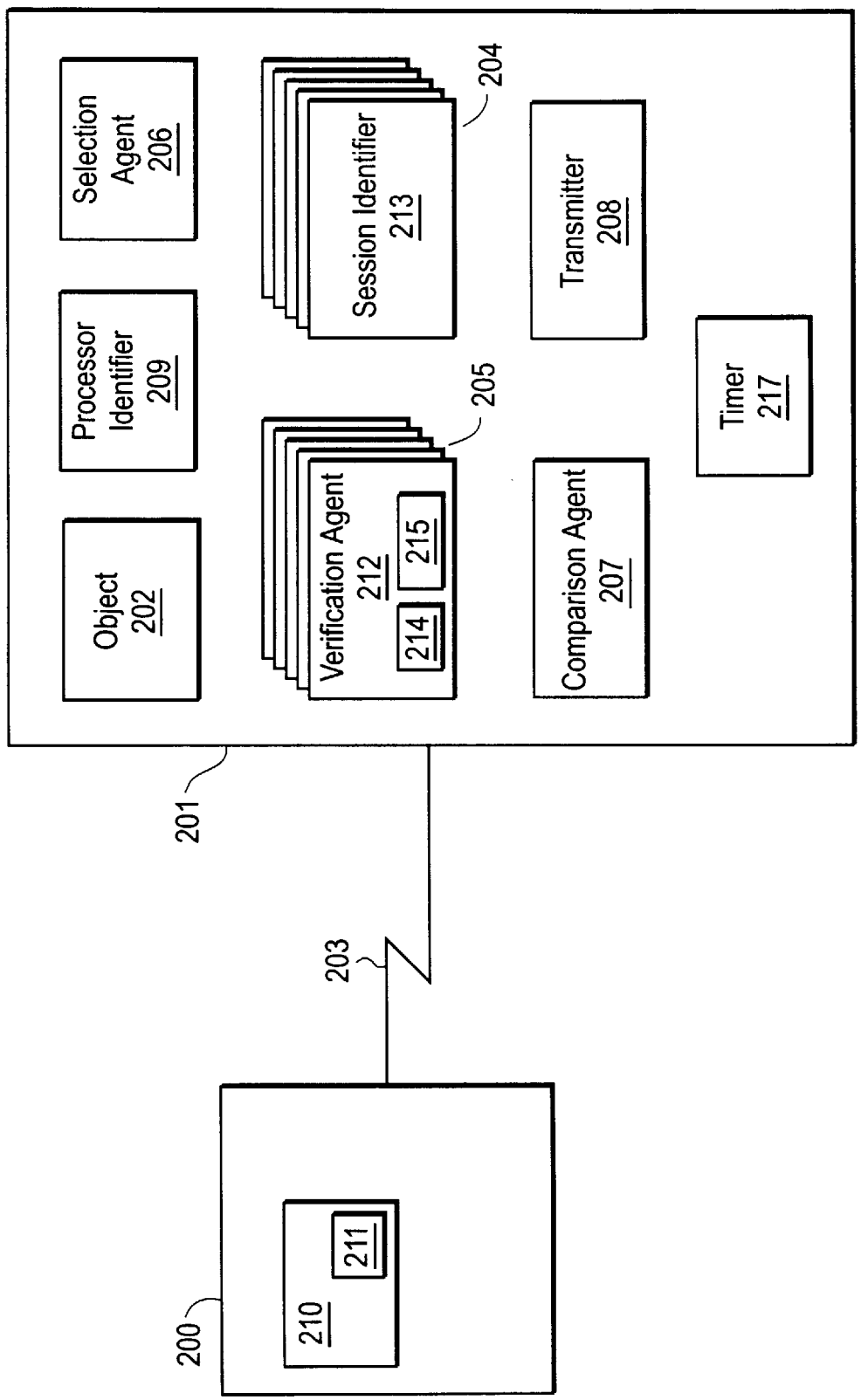
FIG. 2 is a block diagram illustrating a second embodiment of the system of the present invention wherein the system for controlling access to an object resides in a server.

FIG. 2 is a block diagram illustrating an embodiment of the present invention where client computer 200 seeks access through client/server communication link 203 to object 202 (which may include data and/or programming instructions) stored on server 201. Server 201 includes session identifier generator 204, verification agent module 205, selection agent 206, comparison agent 207, transmitter 208, processor identifier 209, and timer 217.

Client computer 200 includes a processor 210 and embedded information 211, such as a processor number, which identifies processor 210. Processor 210 may be a member of the Pentium® processor family of microprocessors, or a member of a later generation of X86 instruction set compatible processors. Embedded information 211 may be stored in processor 210 in a processor ID register or, alternatively, in a constant ROM that holds data that microcode instructions (stored in a microcode ROM) may use— such as is described in U.S. Pat. Nos. 5,790,834 and 5,794,066, assigned to this application's assignee, and as described in the Pentium® Pro Family Developer's Manual. Future Intel processors will add a new value to those described in the Developer's Manual that can be loaded into a processor ID register. That new value is intended to be statistically unique for a given processor, analogous to its "fingerprint." That statistically unique information can be said to constitute a "processor number" for a given processor. Because such a processor number is only statistically unique, it is possible for more than one platform or device to have the same processor number.

Processor identifier 209 may be a processor number loaded onto server 201 from a client computer. Alternatively, processor identifier 209 may be the value resulting from applying a function to the combination of a processor number and another value, e.g., a server identifier.

Session identifier generator 204 randomly selects a session identifier 213, when client computer 200 attempts to access object 202. Session identifier 213 provides a means for matching a value returned from a client computer 200 with a specific attempt to access object 202. Session identifier generator 204 may be a random number generator for producing session identifiers 213, which each comprise a randomly generated number. Verification agent module 205 includes a plurality of verification agents 212, each containing programming instructions for accessing embedded information 211, a secret key 214, and a calculator 215 for calculating a return value from the combination of embedded information 211, secret key 214, and session identifier 213. Each verification agent 212 may also include programming instructions for requesting client computer 200 to send the return value to server 201. Where processor identifier 209 is derived from applying a function to the combination of a processor number and another value, verification agent 212 can include that other value in addition to secret key 214.

Each verification agent 212 has a different secret key 214. Calculator 215 may calculate a return value that is a function of embedded information 211, secret key 214, and session identifier 213. For example, such a function could perform an XOR on embedded information 211 and secret key 214 to generate an intermediate value, followed by a second XOR on that intermediate value and session identifier 213 to yield the return value. Alternatively, as in the case where verification agent 212 includes another value, e.g., a server identifier, in addition to secret key 214, calculator 215 may employ a hash function, such as SHA-1 or MD5, to calculate a return value that is a function of embedded information 211, secret key 214, session identifier 213 and that additional value.

Secret key 214, included in verification agent 212, may be generated using conventional techniques known in the art, such as generating a random number using a random number generator. Selection agent 206 may randomly select a verification agent 212 from verification agent module 205 in the following manner. Initially, selection agent 206 sequentially assigns a number to each verification agent 212. When a user subsequently seeks access to object 202, selection agent 206 randomly generates a number that falls within the range of those assigned to the verification agents 212 included in verification module 205, then selects the verification agent 212 that corresponds to that randomly selected number.

The software or hardware constituting verification agent 212 does not have to be physically located or stored on server 201. As will be readily apparent to those skilled in the art, some or all of the software and/or hardware that performs the verification agent 212 function—i.e., accessing embedded information 211 and calculating from that embedded information a return value for comparison to processor identifier 209—may be located or stored remotely from server 201, such as on client computer 200 or another device, or on a separate machine readable medium, e.g., a portable disk.

Server 201 also includes timer 217. To prevent a malicious user from having enough time to intercept verification agent 212, and use that verification agent to calculate a return value, timer 217 may disconnect server 201 from client computer 200, when verification agent 212 fails to return to server 201 within a prescribed amount of time a return value for comparison to processor identifier 209.

Figure 3:
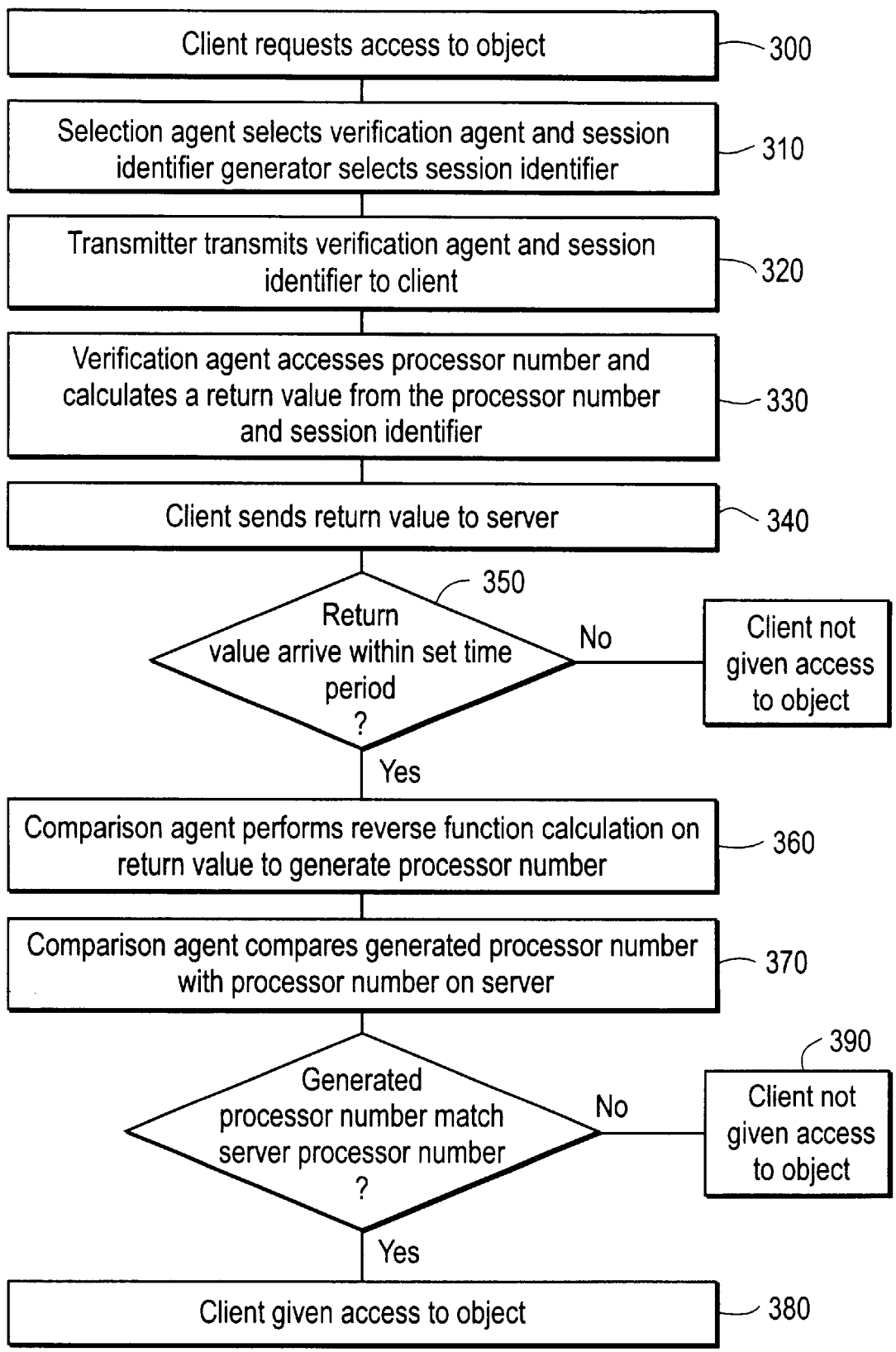
FIG. 3 is a flow diagram illustrating a method for controlling access to an object stored on the server shown in FIG. 2.

FIG. 3 is a flow diagram that shows the steps server 201 follows to determine whether client computer 200 should have access to object 202, where both processor identifier 209 and embedded information 211 are processor numbers. The process begins with client computer 200 requesting access to object 202, over client/server communication link 203 (block 300). In response, server 201 causes selection agent 206 to randomly select a verification agent 212 from verification agent module 205, and causes session identifier generator 204 to randomly select a session identifier 213 (block 310). Transmitter 208 then transmits verification agent 212 (which includes secret key 214, calculator 215, and programming instructions for accessing processor number 211 and for requesting client computer 200 to send a return value to server 201) and session identifier 213 from server 201 through client/server communication link 203 to client computer 200 (block 320).

As an alternative to having transmitter 208 send verification agent 212 to client computer 200, software may be loaded onto client computer 200 that enables client computer 200 to retrieve verification agent 212, after it is selected by selection agent 206. That same software can then facilitate the transmission of verification agent 212 from server 201 to client computer 200. In addition, software pre-installed onto client computer 200, rather than software downloaded from server 201, may perform the functions that verification agent 212 would otherwise perform.

Server 201 copies and stores secret key 214 and session identifier 213 prior to transmission of verification agent 212 to client computer 200. Processor 210 executes the programming instructions included in verification agent 212 to cause verification agent 212 to read embedded information 211, then calculate a return value from the combination of processor number 211, secret key 214 and session identifier 213 (block 330). Processor 210 then executes additional code included in verification agent 212 to cause client computer 200 to send the return value over client/server communication link 203 to server 201 (block 340).

If the return value arrives at server 201 before timer 217 disconnects server 201 from client computer 200 (block 350), comparison agent 207 performs a reverse function calculation on the return value to generate a processor number (block 360). If the return value includes the XOR generated result described above, comparison agent 207 uses the stored session identifier 213 when applying the reverse function to generate the intermediate value, and then uses the stored secret key 214 when applying the reverse function to generate the processor number. In this example, comparison agent 207 acts as a processor number generator for generating a processor number from the return value, secret key 214, and session identifier 213. Comparison agent 207 then compares that generated processor number with processor number 209 (block 370). If they are identical, server 201 permits client computer 200 to access object 202 (block 380). If they are not identical, server 201 disconnects from client computer 200 (block 390).

Figure 4:
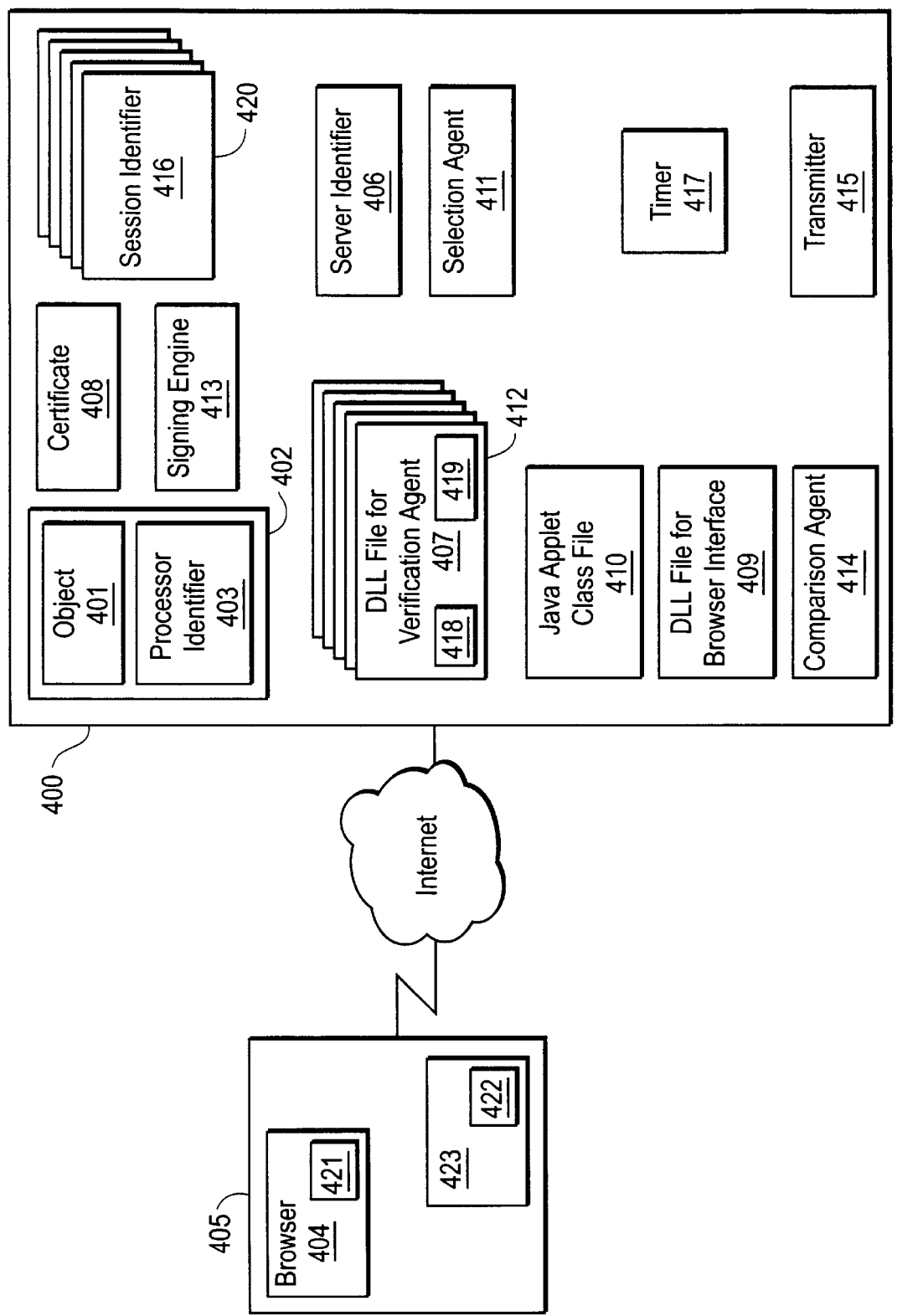
FIG. 4 is a block diagram illustrating a third embodiment of the present invention wherein the system for controlling access to an object resides in a web server.

FIG. 4 illustrates an embodiment of the present invention where the server is web server 400, object 401 is stored in web site 402 and the verification agent is downloaded as a dynamically linked library ("DLL") file 407 from web server 400 to browser 404, which is loaded onto client computer 405. In this particular embodiment, server identifier 406 is associated with web server 400.

Web server 400 includes certificate 408 for certifying the identity of the owner of web site 402 and the owner's public key, by signing values reflecting that identity and public key with the private key of a certificate authority—such as Verisign™. In this way, certificate 408 binds the web site owner's identity with its public key. Those skilled in the art will recognize how to obtain or create such certificates verifying a web site owner's identity and public key, associated with a public key/private key pair. Signing engine 413 signs either a Cabinet file or Jar file, depending upon whether a Microsoft® or Netscape® browser is used as browser 404, using the web site owner's private key. Alternatively, signing engine 413 may sign a hash of that Cabinet or Jar file with that private key.

The Cabinet or Jar file will enclose a Java™ applet, which will include Java applet class file 410, wrapper file 409 (which may be a DLL file that enables the applet to interface with browser 404), and a DLL file 407 that selection agent 411 will select from DLL file module 412. Wrapper file 409 may differ for different browsers, e.g., being designed for Raw Native Interface™ for Internet Explorer™ or for Java Native Method Invocation™ for Netscape Navigator™. FIG. 4 also shows processor identifier 403, comparison agent 414, transmitter 415, session identifier 416 and timer 417, which each perform functions like those provided by their counterparts shown in FIG. 2.

Object 401 may include data and/or instructions that a user may want to access over the Internet. For example, object 401 may include medical records or bank or stock brokerage account records. Object 401 may include a computer program, such as a program accessed to join a chat room or other on-line communication group. Object 401 could include video, audio or other content to be downloaded to subscribers or may relate to certain services that the web site owner provides to its customers.

In each of these instances, and in many others that will be readily apparent to those skilled in the art, it may be desirable to restrict access to object 401. When object 401 is content, the owner of web site 402 may only want to permit access to paying subscribers. When object 401 includes certain confidential records or accounts pertaining to an individual, it may be desirable to restrict access to that individual. If object 401 is invoked to permit access to a chat room, it may be desirable to register participants in advance—then revoke privileges for those who misbehave. The system shown in FIG. 4 provides a means for identifying the platform or device trying to access object 401, enabling web site 402 to grant access to those having permission only.

Web server 400 may want to identify those seeking access to object 401 for reasons other than access control. For example, when object 401 relates to certain services, the service provider may want the ability to identify particularly valuable customers who should receive special benefits—e.g., discounts, special offers, premium service, free goods and services. The system shown in FIG. 4 provides such an identification capability in addition to enabling access control.

Figure 5:
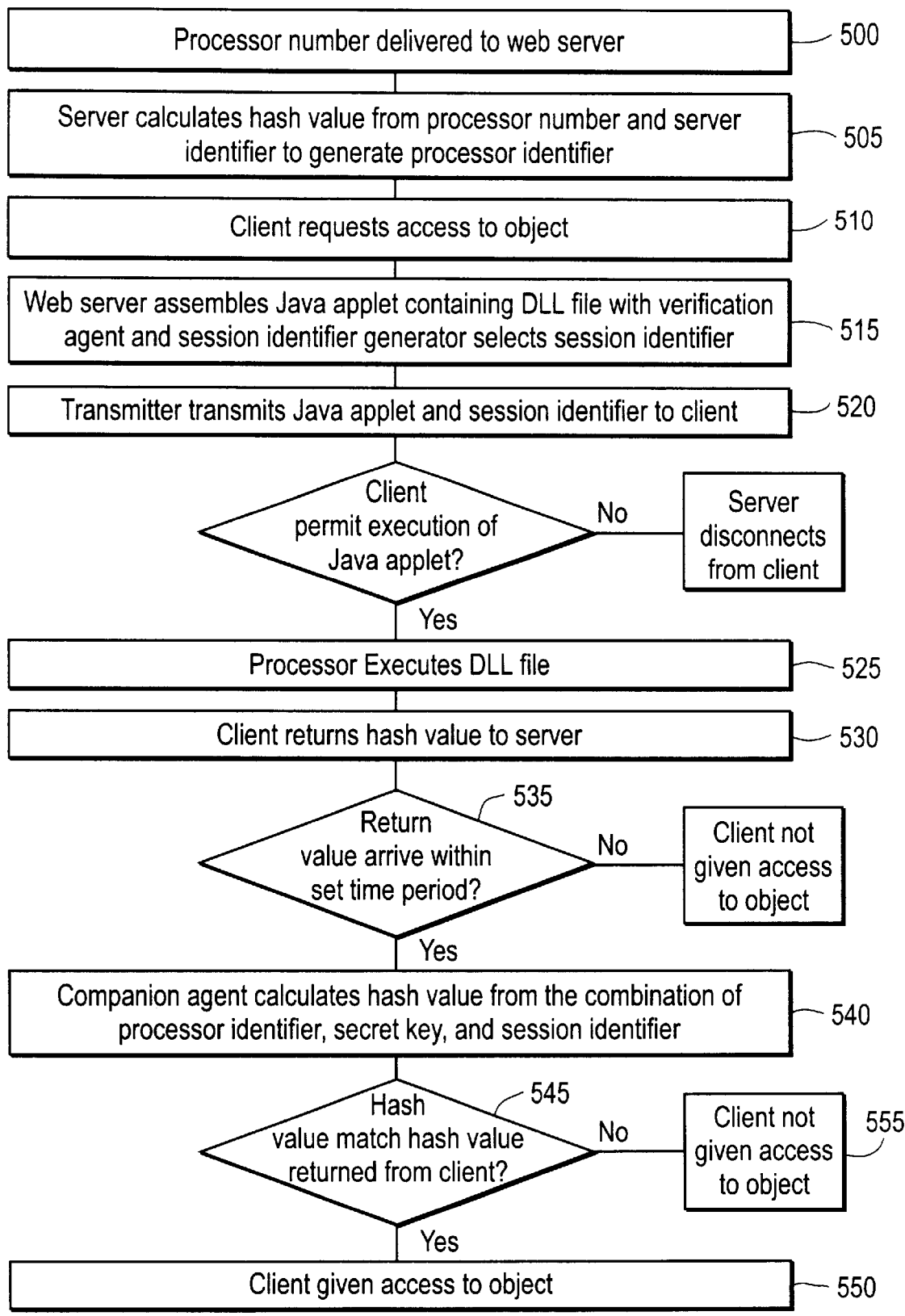
FIG. 5 is a flow diagram illustrating a method for controlling access to confidential records stored on the web server shown in FIG. 4.

FIG. 5 is a flow diagram that shows how web server 400 enables authorized client computers 405 to access confidential records stored as object 401. When such records are stored in web site 402, web server 400 registers the client computers 405 for which server 400 will allow access. Registration requires providing server 400 with information embedded in a client computer's processor. Such information may comprise a processor number, which the client computer may send over the Internet to web server 400, using a Secured Socket Layer or other data encryption means. Alternatively, the computer owner may deliver the processor number, for entry into web server 400, by electronic or regular mail, by phone or other conventional communications means (block 500).

If object 401 is a patient's medical record, for example, and that patient has a computer or other device that can access web site 402, server 400 may store a processor identifier 403 corresponding to that computer or device when storing that medical record. Processor identifier 403 may be the computer's processor number or a value resulting from applying a function to the combination of that processor number and a value associated with web server 400, such as server identifier 406. To register a client computer for permitted access to object 401, such as the patient's computer described above, server 400 can generate a hash value calculated from the combination of the computer's processor number and server identifier 406. Server 400 can then store the resulting hash value as processor identifier 403 (block 505).

Through browser 404, client computer 405 can request access to the confidential records or documents stored as object 401. Browser 404 may transmit such a request over the Internet to web server 400 via standard network protocols using a standard format to address object 401—such as a Uniform Resource Locator (URL).

When client computer 405 requests access to object 401 (block 510), web server 400 determines whether to grant the request in the following manner. First, selection agent 411 randomly selects a DLL file 407 from DLL file module 412. DLL file 407 includes secret key 418, calculator 419, and server identifier 406. Each DLL file 407 included in DLL file module 412 preferably has a different secret key 418. Web server 400 assembles either a Cabinet file or Jar file, depending upon the browser client computer 405 uses for browser 404, that encloses a Java applet, which includes Java applet class file 410, wrapper file 409 (for enabling the processor verification file to interface with browser 404), and DLL file 407. Web server 400 then causes signing engine 413 to sign that Java applet containing file, or a hash of that file, with the web site owner's private key. Concurrently, session identifier generator 420 randomly selects a session identifier 416 (block 515). Web server 400 stores copies of secret key 418 and session identifier 416 that comparison agent 414 will use when checking whether a return value matches processor identifier 403.

Next, transmitter 415 sends the signed Java applet containing file (or a signed hash of that file along with the applet), a copy of certificate 408, and session identifier 416, from web server 400 to browser 404 (block 520). Browser 404 includes Java applet authorization agent 421, which notifies the user of client computer 405 that a Java applet seeks access to information embedded in processor 423, which may be processor number 422. After the user establishes that the Java applet is a trusted applet, e.g., after the certificate authority's public key is used to decrypt certificate 408 to reveal the identity of the web site owner, the user decides whether to grant access. If the user refuses to grant access to processor number 422, web server 400 disconnects from client computer 405. If the user grants access, then processor 423 will execute DLL file 407 (block 525).

Because the Java applet containing file was signed by the web site owner's private key, that file must be decrypted prior to execution using the web site owner's public key, which is derived from certificate 408. In the alternative embodiment, where a signed hash is transmitted to browser 404 along with the unsigned Java applet containing file, the signed hash is decrypted and then compared to a hash of that file to check the integrity of the file. If the decrypted hash matches the hash of the file, then integrity is verified and the applet can be executed.

After the user establishes a Java applet as a trusted applet, the user can instruct browser 404 to handle subsequent transactions involving the trusted applet by directly loading the applet onto client computer 405 without requesting additional authorization.

Execution of DLL file 407 enables access to processor number 422, calculation of a hash value from the combination of processor number 422, server identifier 406, secret key 418, and session identifier 416, and delivery of a request to client computer 405 to return that hash value to web server 400.

DLL file 407 may be constructed in a tamper resistant manner, such as by using the techniques described in copending U.S. patent application Ser. No. 08/662,679, filed Jun. 13, 1996, assigned to this application's assignee. In some embodiments, web server 400 may require the user to enter a user ID and password, using techniques well known to those skilled in the art, before transmitting the Java applet containing file to client computer 405.

As an alternative to transmitting from web server 400 to client computer 405 a Cabinet or Jar file that contains Java applet class file 410, wrapper file 409, and DLL verification agent file 407, client computer 405 may include a pre-installed browser plug-in that can perform the functions that the Java applet performs. Such a plug-in can retrieve verification file 407 (after selection agent 411 selects it), cause that file to be transmitted from web server 400 to client computer 405, then perform those functions that would otherwise be performed by the Java applet. Such a browser plug-in may be stored on client computer 405 or, alternatively, on a separate machine readable medium, e.g., a portable disk.

After the hash value has been calculated from the combination of processor number 422, server identifier 406, secret key 418, and session identifier 416, browser 404 sends that hash value over the Internet to web server 400 (block 530). The hash value preferably is sent using the Secured Socket Layer or another means for encrypting that value. If web server 400 receives the hash value within the time set by timer 417 (block 535), then comparison agent 414 calculates a hash value from the combination of processor identifier 403, secret key 418 and session identifier 416 (block 540). If that hash value matches the hash value that arrived from client computer 405 (block 545), then the client is granted access to object 401 (block 550). If not, then the client is denied access (block 555).

To provide further confidence that client computer 405 matches processor identifier 403 associated with web site 402, web server 400 can select a different DLL file 407 each time a client computer requests access to object 401. Similarly, web server 400 can repeat the verification process multiple times, each time using a different DLL file 407 that will have a different secret key 418, prior to granting access. In addition, because the only action required to generate new DLL files for verification agents is to generate new secret keys, a new set of DLL files may be generated for DLL file module 412 relatively quickly—when desired. Rather than generate DLL files for storage in DLL file module 412, to ensure that stale DLL files will not be susceptible to tampering DLL files can alternatively be dynamically generated only in response to access requests.

Different web sites may impose different requirements relating to the frequency with which different verification agents must be used when access to an object is requested. At one extreme, a web site may require that a verification agent be used once only, then discarded. At the other extreme, a web site may permit a client computer to download a verification agent when first requesting access to the web site, then permit the client computer to use that same verification agent for each subsequent access request. Under that scenario, in response to each access request, web server 400 will download a new session identifier. The client computer will then use the previously retrieved permanent verification agent to calculate a return value based on the processor number, the secret key associated with the permanent verification agent, and the new session identifier, then return that value to the web server for comparison to processor identifier 403, as described above. As an alternative to either single use or permanent use of a verification agent, a web site can assign a time period during which a verification agent remains valid. In some instances, that time period may be a day or less, in others perhaps as long as a year or more. The time period may be equal to the time period timer 417 sets, which may enable the same verification agent to be used until the time set by timer 417 for return of the return value to the server expires.

Although the embodiments of the present invention shown in FIGS. 4 and use a Java applet to download the DLL file that includes the verification agent, other real time dynamic software capable of downloading an executable program from a web server to a client computer, such as ActiveX™, may be used instead.

Figure 6:
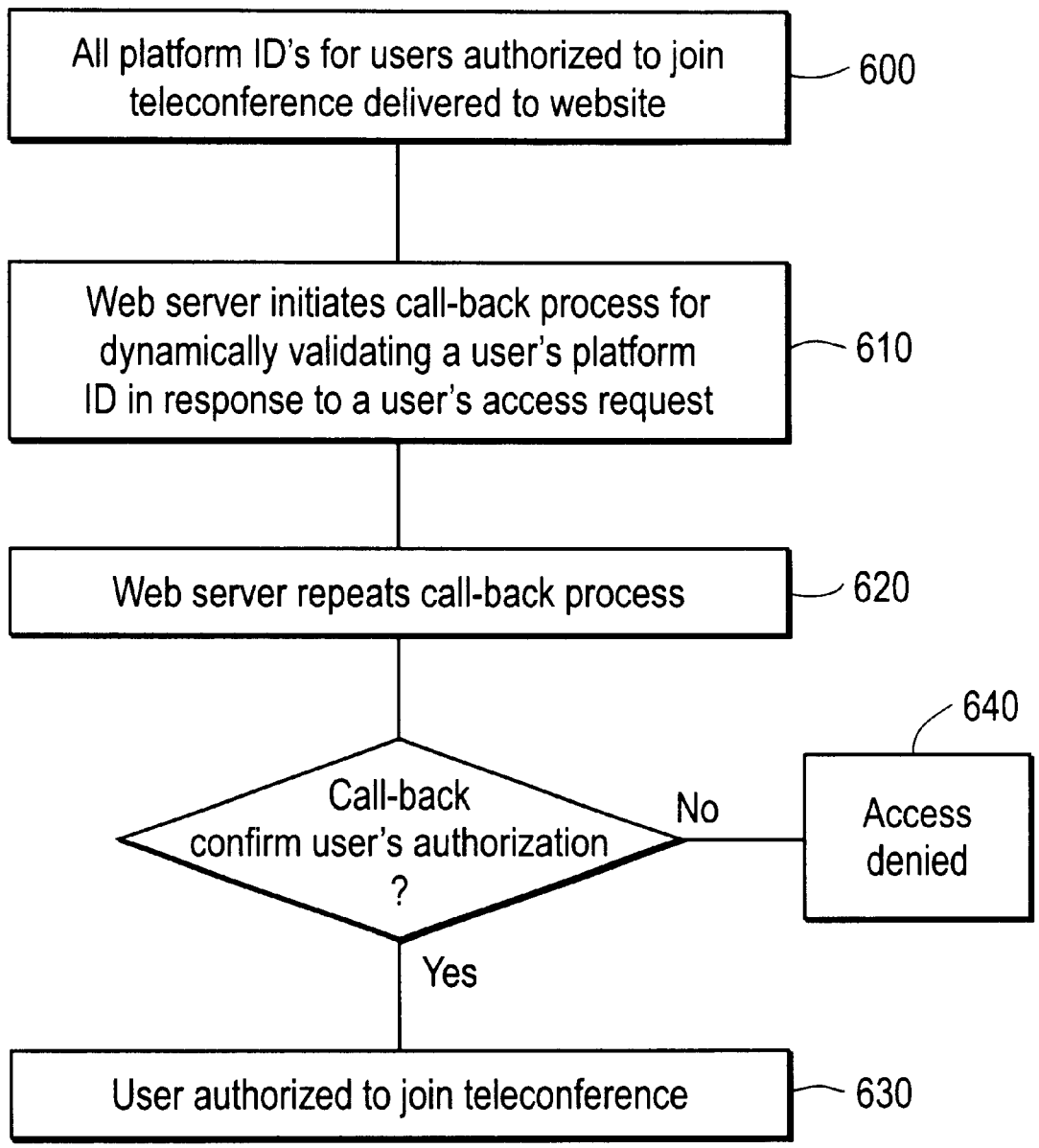
FIG. 6 is a flow diagram illustrating an embodiment of the present invention where a "caller ID" function is employed to verity the identity of those seeking to participate in a private teleconference.

FIG. 6 is a flow diagram illustrating an embodiment of the present invention where a "caller ID" function is employed to verify the identity of those seeking to participate in a private teleconference. This embodiment addresses, for example, the current difficulty of identifying the origin of a personal computer user who seeks to join such a teleconference through an Internet connection. Such difficulties may arise from the current ISP vendor practice of recycling the IP addresses of personal computers that seek access to web site URLs, and because IP addresses can be counterfeited.

As is apparent from the above description, a potential solution to this problem is to use a "caller ID" like function that uses dynamic call-back software to match a statistically unique platform ID with a platform ID previously authorized to participate in such a teleconference.

As shown in FIG. 6, to use such a "caller ID" feature in such an Internet teleconferencing application, all the platform IDs for the computers or other devices belonging to users who are authorized to call-in to the teleconference must be delivered to the web site, which will control access to the teleconference (block 600). When a user requests access to the teleconference, the web server initiates a "call-back" process for dynamically validating the user's platform ID (block 610). Such a dynamic call-back process may comprise downloading a Java applet that includes a "caller ID" plug in—such as is described above in connection with the apparatus and flow chart shown in FIGS. 4 and 5. Such a process may employ hash and encryption functions, and a timing mechanism, to ensure the integrity of the data returned to the web server that is used to verify a user's platform's identity. FIG. 6 further depicts the dynamic renewal of the "call-back" process, which provides even greater protection against imposter access (block 620).

If the "call-back" process confirms that the user is authorized to join the teleconference, access is granted (block 630). Otherwise, access is denied block 640).

As those skilled in the art will readily appreciate, this "caller ID" application for the Internet may employ many of the features that other forms of telecommunications currently provide, such as "call waiting" and "call priority." In addition to using such features for voice or even video conferencing, such features can enable a service provider to provide customized services for different customers, identified by their computers' different platform identifiers.

What makes these types of applications, or usage models, possible is the presence of a statistically unique platform identifier. Although the apparatus represented in block diagram form in FIGS. 2 and 4 may be used to implement such applications, those skilled in the art will recognize that many variations of such systems may be used instead. Any mechanism that permits access to the platform identifier, for the purpose of identifying a particular platform, falls within the spirit and scope of the present invention.

Although the description that accompanies those figures refers to a processor number, or hash value based on that number, the present invention may use other means to identify the platform. For example, the above described Internet caller ID usage concept may employ any hardware based platform identifier that may identify a particular platform—whether it be a smartcard, an embedded certified private/public key pair, or some other identifier embedded in a semiconductor device. In addition, although the embodiments described apply a hash value to a platform identifier, other encryption algorithms may be applied instead.

The present invention is not limited to the particular usage models described above. Many others exist, including those relating to: video conferencing, teleconferencing and on-line group activity; customer tracking; on-line voting, surveys, or similar activities; or virtual private networks.

For Internet based conferencing, the device controlling the communication connection may grant access only to those users who present a valid machine "fingerprint" based on the device's platform identifier. Where all parties to the conference are connected through a server, the server can check each caller for the presence of a valid platform identifier before allowing each participant to join the conference. This usage model may be applied to various business conferencing activities, including video conferencing and those involving document exchange in addition to the conventional audio conference.

Where the connection is from one device to another, the server may play a more limited role. For example, where a receiving device controls the connection, the server may simply receive the platform identifier from the calling device then forward it to the receiving device. If the platform identifier for the calling device matches one stored on the receiving device, then the receiving device may authorize the connection. Alternatively, a web server may act as a gate keeper that checks the identity of two remote users who seek to exchange data or information by checking their platform identifiers against those stored on the web server, then permits the exchange to go forward after verifying each user's identity.

A similar usage model can be applied to restrict who can access certain sites—in effect, creating a "gated community." Such a usage model may be particularly attractive for creating protected sites for children, senior citizens, particular religious or ethnic groups, or teenage girls. Various chat rooms, on-line gaming activities, bulletin boards, and message postings could benefit from such a protected environment. Requiring those accessing such protected sites to provide their platform identifiers makes it easy to identify those engaged in abusive activity. Such abusive users can be banned from accessing such web sites by maintaining a record of platform identifiers that are associated with abusive users, thereby, ensuring a safe and friendly community of users.

Another valuable application for the platform identifier is to permit only certain authorized devices to modify the contents of a web site. For example, only certain platforms, with earlier registered platform identifiers, could be permitted to alter web site contents that pertain to on-line auction postings, on-line auction bids, and a wide variety of commercial information.

Such conferencing and on-line group activity usage models may advantageously require two factors to validate a user, e.g., a user ID/password combination (or other form of user identification) and the device identification via its processor number or other statistically unique identifier. To reduce the likelihood of improper access, by a hacker or undesirable caller, both a specific platform identifier and user ID/password combination could be required to obtain access. When two factors are required, an unauthorized user who obtains only an authorized user's ID/password may be denied access when trying to establish a connection from a different platform. Alternatively, because such a platform identifier enables a server to track usage patterns, the server can be programmed to trigger a particular response when the user's ID/password combination is used with a platform other than the one typically employed. For example, the server can request additional information about the user prior to permitting the user to log-in, or can deny access, or can contact security.

Those skilled in the art will readily appreciate the advantages such a two factor approach provides. Although a user ID can be altered or duplicated by a malicious user, which is made fairly easy by the open enrollment culture of the Internet, combining such a user ID with a platform identifier provides a web server or computer user with the option of accepting or rejecting log-in requests, when the user ID does not match its companion platform identifier.

For the customer tracking usage model, such a platform identifier can be used to track customer buying habits, which may enable on-line retailers to tailor their delivery of marketing materials, special offers, etc . . . to particular customers. Similarly, such a platform identifier can enable global tracking of a user's surfing patterns to enable a content provider to deliver or offer content that is customized to the user's tastes. One advantage a hardware based platform identifier has over a software based tracking mechanism, e.g., a cookie, is that it is not stored on a device's disk drive or other "publicly accessible" component. This usage model further enables on-line retailers to reward valuable customers with various benefits, prizes, discounts, frequent buyer points, etc . . . , or to offer them special access privileges, e.g., to an exclusive buying club.

For the usage model addressing limited access, the user ID, platform identifier combination can be particularly useful. By requiring both factors, one can better ensure that a given user is permitted to vote or answer a survey only once, or given a single reward, lottery or raffle ticket. This can be easily accomplished by relying on the platform identifier to register receipt or usage.

For the virtual private network usage model, the platform identifier can be a more reliable indicator of identity than a software identification mechanism. In addition, like the user ID example described above, in a virtual private network the platform identifier can be used with a software based public/private key pair as a further check on the identity of a user claiming to rightfully possess a given software based public/private key pair.

Those skilled in the art will recognize many additional applications for a platform identifier that can verify the identity of a user. The foregoing thus serves only as a detailed description of particular embodiments of the present invention. The invention embraces all alternatives, modifications and variations that fall within the letter and spirit of the claims, as well as all equivalents of the claimed subject matter.

What is claimed is:

1. A method for permitting access to a server through a virtual private network, comprising:

receiving a request to access the server from a remote user having a certificate for verifying the users identity and public key, and using a platform having a hardware based platform identifier, decrypting the certificate using a certificate authority's public key;

checking the platform identifier, and allowing the user to access the server, wherein the platform identifier is a hash of a value comprising a processor number.

2. A method for enabling a platform to access via the Internet an object stored on a web server comprising:

storing a platform identifier on the web server;

receiving a request from a platform for access to the object;

initiating a dynamic call-back process for dynamically accessing a hardware based platform identifier associated with the platform;

comparing the platform identifier associated with the platform to the platform identifier stored on the web server; and granting access to the object if the platform identifier associated with the platform matches the platform identifier stored on the web server.

* * * * *

UNITED STATES PATENT AND TRADEMARK OFFICE
CERTIFICATE OF CORRECTION

PATENT NO.   : 6,523,067 B2
DATED        : February 18, 2003
INVENTOR(S)  : Abramson It is certified that error appears in the above-identified patent and that said Letters Patent is hereby corrected as shown below:

Column 1,
Line 6, delete "09/34,051", insert -- 09/234,051 --.

Column 2,
Line 49, delete "verity", insert -- verify --.

Column 9,
Line 26, after "4 and", insert -- 5 --.

Signed and Sealed this

Eleventh Day of November, 2003

JAMES E. ROGAN
*Director of the United States Patent and Trademark Office*